(12) United States Patent
Kamizono

(10) Patent No.: US 6,236,339 B1
(45) Date of Patent: May 22, 2001

(54) KEY, INPUT UNIT USING SUCH KEY, AND CONTROL SYSTEM COMPRISING SUCH INPUT UNIT AND ELECTRONIC APPARATUS ACOUSTICALLY CONNECTED TO SUCH INPUT UNIT

(75) Inventor: Hidenobu Kamizono, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/271,607

(22) Filed: Mar. 17, 1999

(30) Foreign Application Priority Data

Mar. 17, 1998 (JP) .................................................. 10-066427

(51) Int. Cl.[7] .................................................. H03K 17/94
(52) U.S. Cl. .............................. 341/27; 341/22; 346/168; 400/477; 400/712; 178/17 C
(58) Field of Search ........................ 341/22, 27; 345/168; 400/712, 477, 479; 178/17 C

(56) References Cited

U.S. PATENT DOCUMENTS

| 4,376,469 | * | 3/1983 | Longrod | 400/477 |
| 4,384,633 | * | 5/1983 | Hoyer-Ellefsen | 400/477 |
| 4,430,644 | * | 2/1984 | Blanchard, Jr. et al. | 178/17 C |
| 4,599,607 | * | 7/1986 | Hill | 341/27 |

FOREIGN PATENT DOCUMENTS 58-132834   8/1983  (JP) .

\* cited by examiner

*Primary Examiner*—Michael Horabik
*Assistant Examiner*—Timothy Edwards, Jr.
(74) *Attorney, Agent, or Firm*—Ostrolenk, Faber, Gerb & Soffen, LLP

(57) ABSTRACT

A key for transmitting data to an electronic apparatus includes a key top, a sound generating mechanism connected to the key top for generating a predetermined sound without any electrical power supply when the key top is depressed, and an outer sleeve receiving the sound generating mechanism. The outer sleeve has an opening portion for outputting the sound to the outside so that the sound can be received by the electronic apparatus. The acoustic communication system between an input unit and the electronic apparatus may dispense with any cable there between and also dispense with any electrical power supply for the input unit.

13 Claims, 9 Drawing Sheets

KEY, INPUT UNIT USING SUCH KEY, AND CONTROL SYSTEM COMPRISING SUCH INPUT UNIT AND ELECTRONIC APPARATUS ACOUSTICALLY CONNECTED TO SUCH INPUT UNIT

BACKGROUND OF THE INVENTION

1. Field of the Invention

The present invention relates to a control system for an electronic apparatus such as an information processing unit, an input unit for inputting data into this electronic apparatus and a key for use in this input unit.

2. Description of the Related Art

Keyboards are conventionally used as data input units for entering data into information processing units (hereinafter referred to as IPUs).

In general, such a keyboard is connected to an IPU through a cable or the like. A plurality of keys are provided on the keyboard. The respective keys work as electric switches. When a user depresses a key, a predetermined signal for identifying that key is generated. This signal is transmitted to the IPU through the cable.

Since the conventional keyboard is connected to the IPU through the cable, it has the disadvantage that the distance between the IPU and the keyboard is bound by the length of the cable, that is the keyboard cannot be located at a longer distance from the IPU than the length of the cable, reducing the usability of the keyboard.

In view of the above disadvantage, a prior art system for dispensing with any such cable for connecting a keyboard to an IPU by acoustically connecting the keyboard to the IPU is disclosed in Japanese Patent Application Laid-Open No. Sho 58-132834. This prior art system is shown in FIG. 10.

Referring to FIG. 10, a keyboard 80 has a plurality of keys (not shown), keyboard circuit 81 for producing a digital signal corresponding to the depressed key when each of the keys is depressed, a converter 82 for converting this digital signal into a signal of a unique frequency, an amplifier 83 for amplifying the signal converted by the converter 82, a speaker 84 driven by the signal amplified by the amplifier 83 to generate an acoustic signal (i.e., a sound), and a battery 85 for transmitting an electrical power to these components.

An IPU 90 has a microphone 91 for receiving the acoustic signal generated by the speaker 84 and sending this acoustic signal to an amplifier 92, which then amplifies the acoustic signal, a converter 93 for converting the acoustic signal amplified by the amplifier 92 into a digital signal on the basis oh the frequency of the amplified acoustic signal, a control circuit 94 for controlling the IPU 90, a display unit 95 for displaying data, a power supply controller 96 for supplying electrical power to the IPU 90 and a power supply line 97 connecting the controller 96 to the commercial power supply source (not shown).

As described above, according to this prior art system, the keyboard and the IPU are acoustically connected to each other to thereby dispense with any cables for connecting the keyboard to the IPU.

However, in the prior art system, the keyboard 80 must be supplied with electrical power by the battery 85. Where the electrical charge stored in the battery 85 has run out, the system has the disadvantage that it is necessary for the user to perform a troublesome operation of replacing the battery 85 for a new one, or recharging the battery 85 if it is rechargeable battery.

SUMMARY OF THE INVENTION

An object of the present invention is to provide an input unit that does not require any supply of electrical power, a key used in this input unit and a controlling system using the input unit for control an electronic apparatus.

According to an aspect of the present invention, there is provided a control system including an input unit provided with a plurality of keys, and an electronic apparatus, said system comprising: said keys each including: a key top, a sound generating mechanism connected to said key top for generating a sound, proper to said key, without any electrical power supply when said key top is depressed, and an outer sleeve accommodating said sound generating mechanism and having an opening portion for outputting said sound to the outside so that said sound can be received by said electronic apparatus; and said electronic apparatus including: a receiving means for receiving said sound, and a converting means for converting said sound that has been received by said receiving means, to a string of specific digital data row corresponding to said sound.

BRIEF DESCRIPTION OF THE DRAWINGS

These and other objects, features and advantages of the invention will become more apparent from the following detailed description when taken in conjunction with the accompanying drawings, in which.

DESCRIPTION OF THE PREFERRED EMBODIMENT

An embodiment of the present invention will now be described referring to the accompanying drawings.

According to the present invention, an electronic apparatus (such as IPU or a household appliance) and an input unit (such as a keyboard or a remote controller) are acoustically connected to each other without electrically connecting the electronic apparatus and to input unit through any cable, to transmit data obtained by user's depression of keys provided on the input unit by to the apparatus.

An embodiment of the present invention comprises an electronic apparatus and an input unit for transmitting data to the electronic apparatus.

In the following description, a keyboard and an IPU are taken as examples of the input unit and the electronic apparatus, respectively.

First of all, a keyboard will be described referring to FIGS. 1 and 2.

Figure 1:
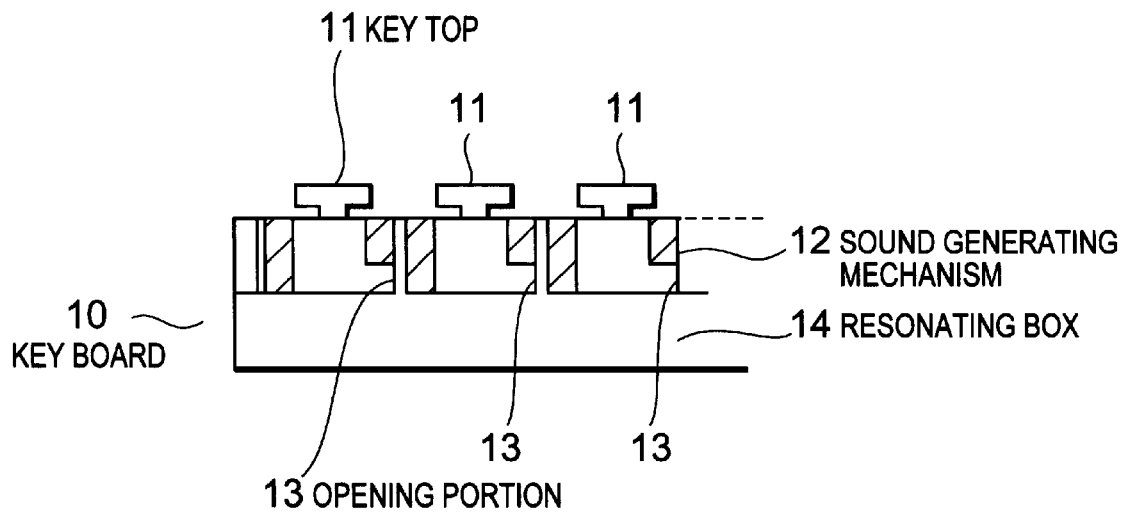
FIG. 1 is a cross-sectional view showing a keyboard provided with a plurality of keys.

FIG. 1 is a cross-sectional view showing a keyboard 10 provided with a plurality of keys. FIG. 2 is a perspective view of the back side of the keyboard 10.

Figure 2:
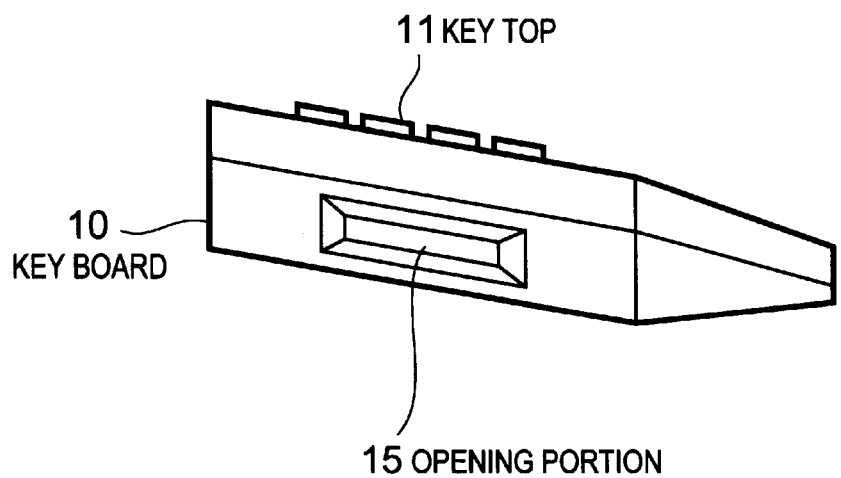
FIG. 2 is a perspective view of the back side of a keyboard.

Referring to FIGS. 1 and 2, each of the keys includes a key top 11 having a top surface on which its function is indicated, a sound generating mechanism 12 for generating a sound having a unique frequency associated with one of the keys, and an opening portion which is formed in the bottom of the sound generating mechanism 12 and through which the sound generated by the sound generating mechanism 12 emitted into a resonating box 14. The opening portions 13 of the keys are in communication with the single resonating box 14.

The sound emitted into the box by the sound generating mechanism 12 is in turn emitted outside of the keyboard 10 through an opening portion 15 formed in the back side of the keyboard 10.

An IPU will next be described referring to FIG. 3.

Figure 3:
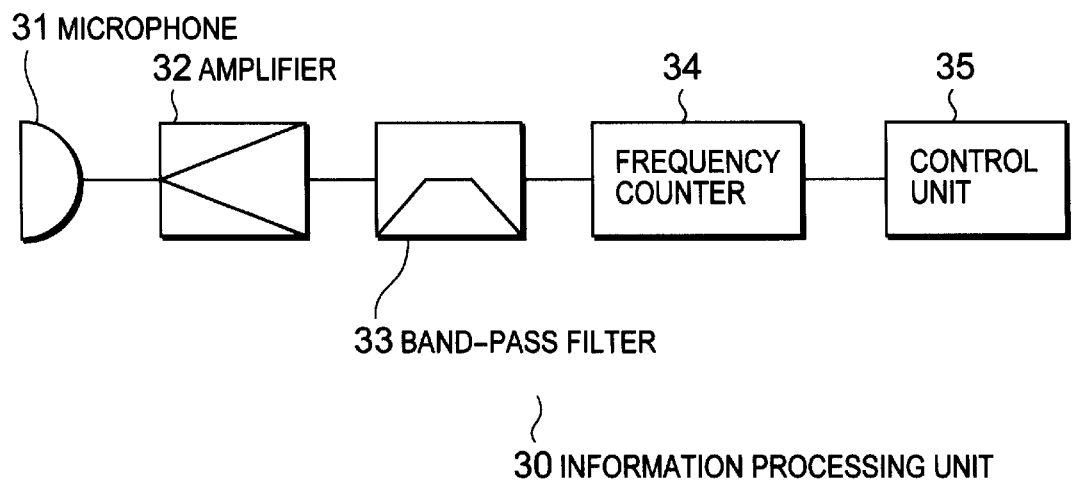
FIG. 3 is a block diagram showing an IPU.

Referring to FIG. 3, an IPU 30 includes a microphone 31 for detecting the above-described sound emitted from the opening portion 15 of the keyboard 10 and converting the sound into an electric signal, an amplifier 32 for amplifying the electric signal, a band-pass filter 33 for removing noise from the amplified electric signal, a frequency counter 34 for measuring the frequency of the sound emitted from the keyboard 10 based on the electric signal from which the noise has been removed, and a control unit 35 for converting the frequency measured by the frequency counter 34 into a predetermined key code (a string of digital data). For this purpose, the control unit 35 includes a table in which the frequencies of the sounds generated from the keys and key codes associated with those frequencies are registered.

Here, when the key top of a plurality of key are simultaneously depressed, a combined sound of a plurality of sounds is emitted from the keyboard 10.

In this case, it is necessary to register the frequency of this combined sound and a key code associated with that frequency in the table in advance.

Otherwise, it is also possible to provide a mechanism for analyzing the combined sound in the IPU 30, identify the frequencies which constitute the combined sound, and make the control unit 35 convert the combined sound into a key code associated with the combination of those identified frequencies.

Further, in the case where after the key top of a certain key (for example, corresponding to a "SHIFT" key of a well-known ordinary keyboard) has been depressed and a sound generated by the depression of this key top (hereinafter referred to as a specifies sound) has been received by the IPU 30, another key top is depressed and a sound generated by the depression of this key top (hereinafter referred to as a regular sound) is received by the IPU 30, the control unit 35 may produce a specific key code on the basis of the sequential reception of the frequencies of the specific sound and the regular sound.

In this case, after the IPU 30 has received the specific sound, if it does not receive any the regular sound (i.e., no key top is depressed) during a predetermined period of time, the control unit 35 may operate as if the IPU 30 had not received the specific sound.

Alternatively, if the IPU 30 receives a sound generated by the depression of the key top of a cancellation key after it has received the specific sound, the control unit 35 may operate as if the IPU 30 has not receive the specific sound.

The installation relationship between the keyboard 10 and the IPU 30 will next be described referring to FIG. 4.

Figure 4:
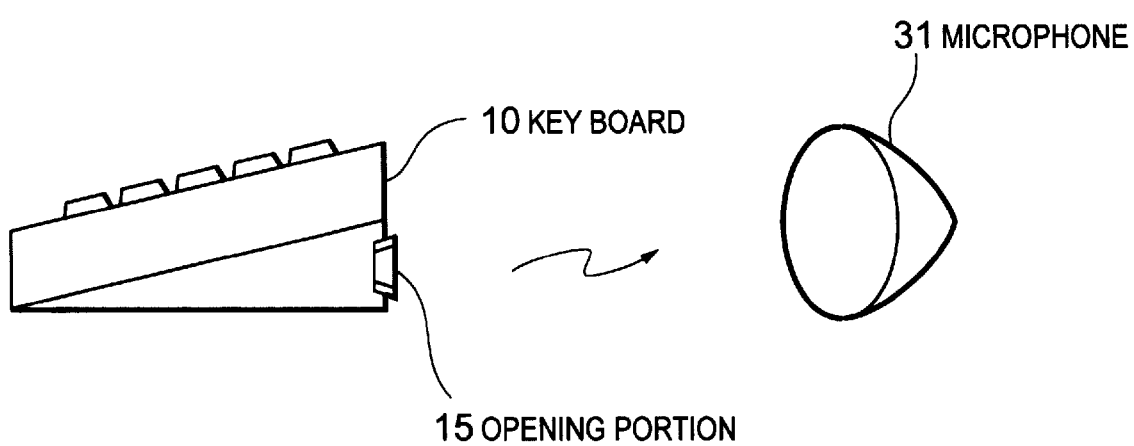
FIG. 4 is a view showing a positional relationship between the keyboard and the IPU.

Referring to FIG. 4, the opening portion 15 of the keyboard 10 is directed toward the microphone 31.

Here, if a microphone having a strong orientation is used as the microphone 31, the voices of people around the IPU and sounds generated from peripheral units which are in operation can be prevented from being picked up by the microphone, i.e., undesired data can be prevented from being entered into the IPU 30.

Also, by applying a sound absorbing material over the casing of the keyboard 10 so that sounds are emitted only from the opening portion 15 of the keyboard 10, not the casing of the keyboard 10, the picking-up of the such sounds by the microphone of another near-by IPU being used by another user can be prevented.

The construction of various keys used as the keys in the keyboard 10 will next be described.

Figure 5:
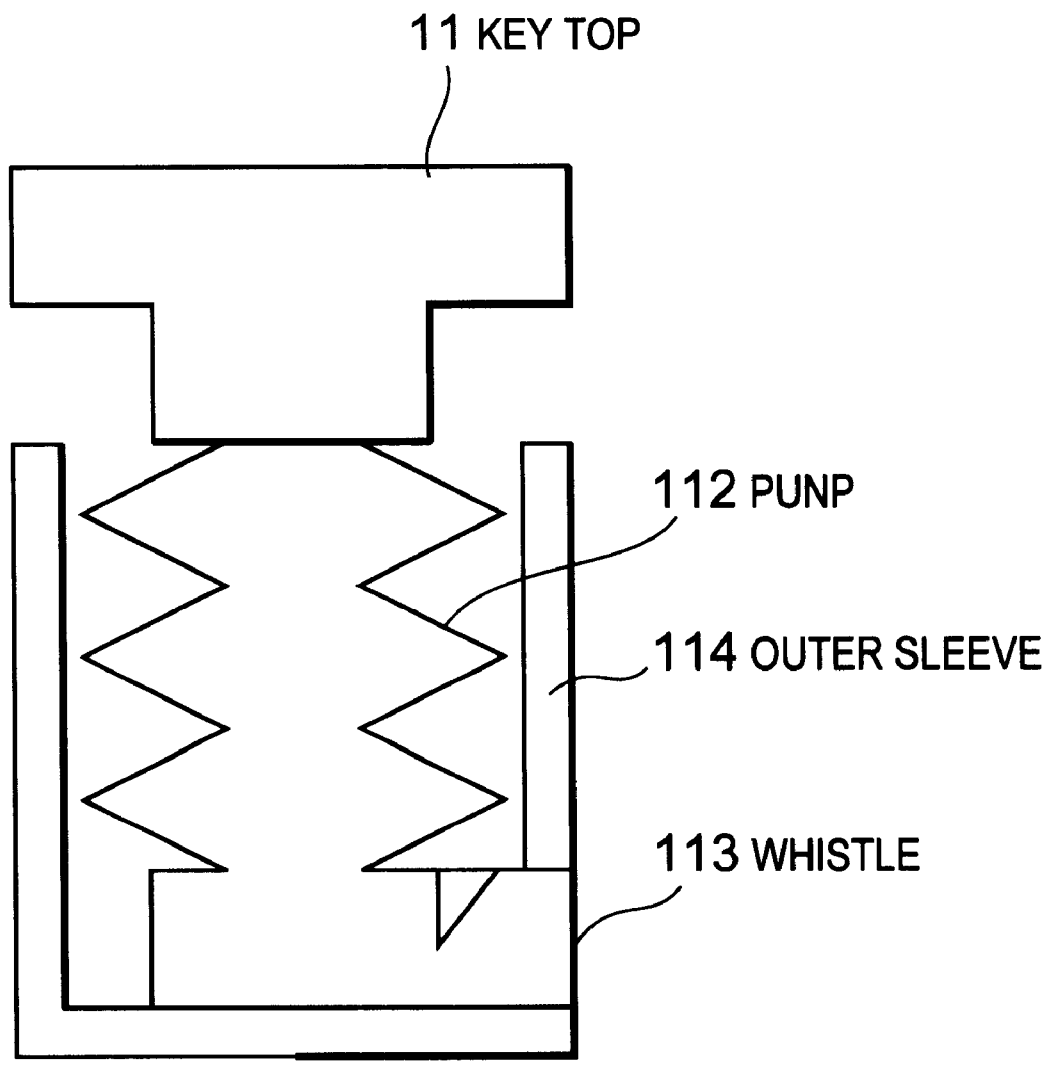
FIG. 5 is a cross-sectional view showing a first type of key.

First of all, a first type of key will be described referring to FIG. 5 showing a cross sectional view illustrating the first type of key.

Referring to FIG. 5, the first type of key includes a key top 11 to be depressed by a user, a pump 112 fixed to the key top 11, a whistle 113 in communication with the pump 112 and an outer sleeve 114 accommodating the pump 112 and the witstle113.

The air within Pump 112 is compressed upon the depression of the key top 11 to bring part of the air into the whistle 113. As a result, the whistle 113 generates a sound with the air sent in.

The sound generated by the whistle 113 can be changed the shape, the material or the like of the whistle 113. thus, a plurality of keys can generate different sounds, respectively, to send different data to the IPU 30.

The pump 112 may be formed of plastic, rubber or the like, and the whistle 113 may be formed of plastic, metal or the like.

Figure 6:
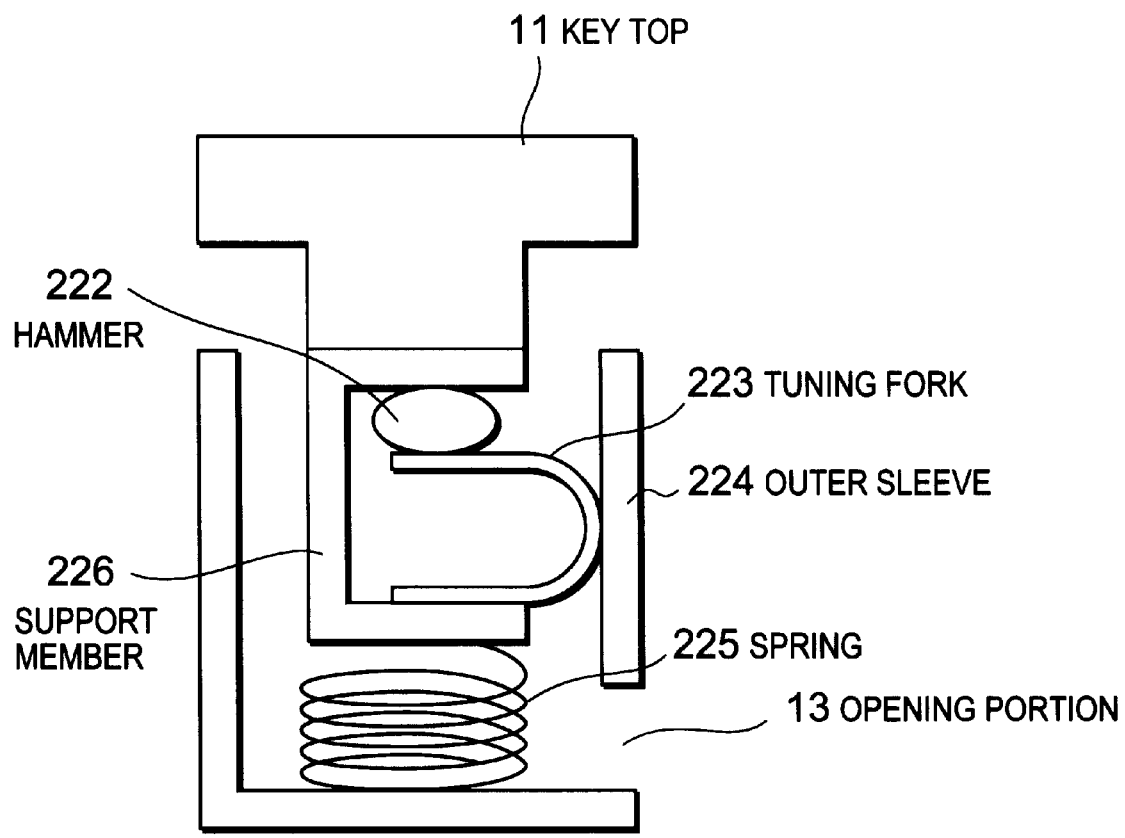
FIG. 6 is a cross-sectional view showing a second type of key.

Incidentally, the generated sound is emitted to the outside of the keyboard 10 through the above-described resonating box 14 and received by the microphone 31 of the IPU 30. This also applies the types of key-s to be described below.

description will be next given of a second type of key referring to FIG. 6.

Referring to FIG. 6, the second type of key includes a key top 11 to be depressed by a user, a hammer 222 secured to the key top 11, a tuning fork 223, a spring 225, a support member 226 and an outer sleeve 224 for receiving these components.

Incidentally, the above-described opening portion 13 is formed in the outer sleeve 224. This also applies to the type of key-s to be described bellow.

The tuning fork 223 is fixed to the outer sleeve 224 and generates a sound upon the collision with the hammer 222 which comes down upon the depression of the key top 11 by the user.

One end of the spring 225 is fixed to the bottom of the outer sleeve 224, and the other end is connected to the lower end of the support member 226. The spring 226 is made of a material which can be compressed and restored. This also applies to the types of keys to be described bellow.

The upper end of the support member 226 is connected to the key top 11.

With such a construction, the hammer 222 comes down on the depression of the key top 11 by the user and collides with the tuning fork 223 so that the tuning fork 223 generates a sound. At this time, the spring 225 is compressed by the support member 226 in response to the user's depression of the key top 11. Thereafter, the key top 11 goes up to the original position due to the returning force of the spring 225 when the user stops the depression of the key top 11.

The sound generated by the key can be changed by changing the shape, the material or the like of the hammer 222 and those of the tuning fork 223. The hammer 222 may be formed of wood, hard rubber, metal or the like and the tuning fork 223 may be formed of metal.

A third type of key will next be described referring to FIG. 7.

Figure 7:
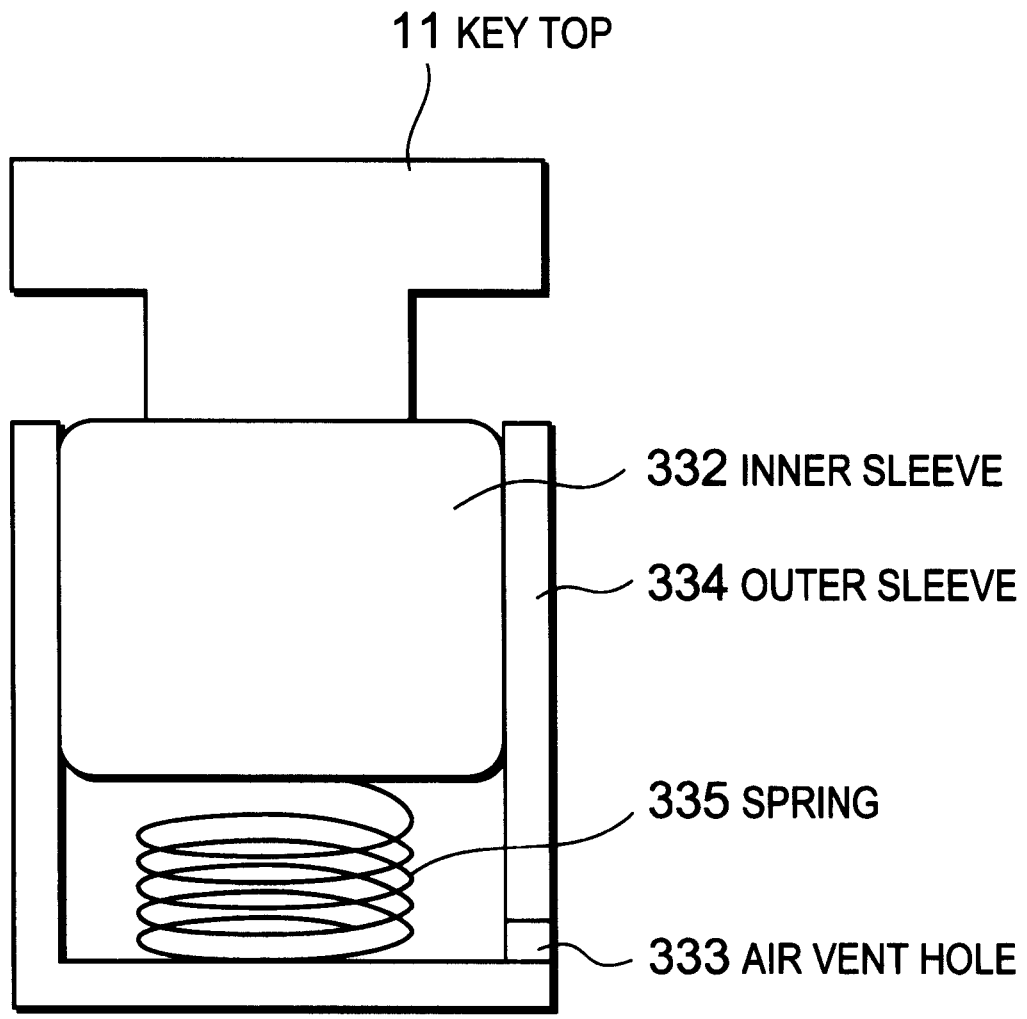
FIG. 7 is a cross-sectional view showing a third type of key.

Referring to FIG. 7, the third type of key includes a key top 11 to be depressed by a user, an inner sleeve 332 directly connected to the key top 11, in intimate contact with the side wall of an outer sleeve 334, generating a frictional sound as a result of the frictional contact with the side wall, and a spring 335.

One end of the spring 335 is fixed to the bottom of the outer sleeve 334, and the other end is connected to the bottom of the inner sleeve 332. Further, an air vent hole 333 through which part of the inner air compressed by the inner sleeve 332 coming down goes out is formed in the outer sleeve 334.

With such a construction, the inner sleeve 332 comes down upon the depression of the key top 11 by the user. At this time, the inner sleeve 332 is brought into frictional contact with the side wall of the outer sleeve 334 to generate a frictional sound.

The sound generated by the key can be changed by changing the shape, the material or the like of the inner sleeve 332 and those of the outer sleeve 334.

A fourth type of key will next be described referring to FIGS. 8 and 9.

Figure 8:
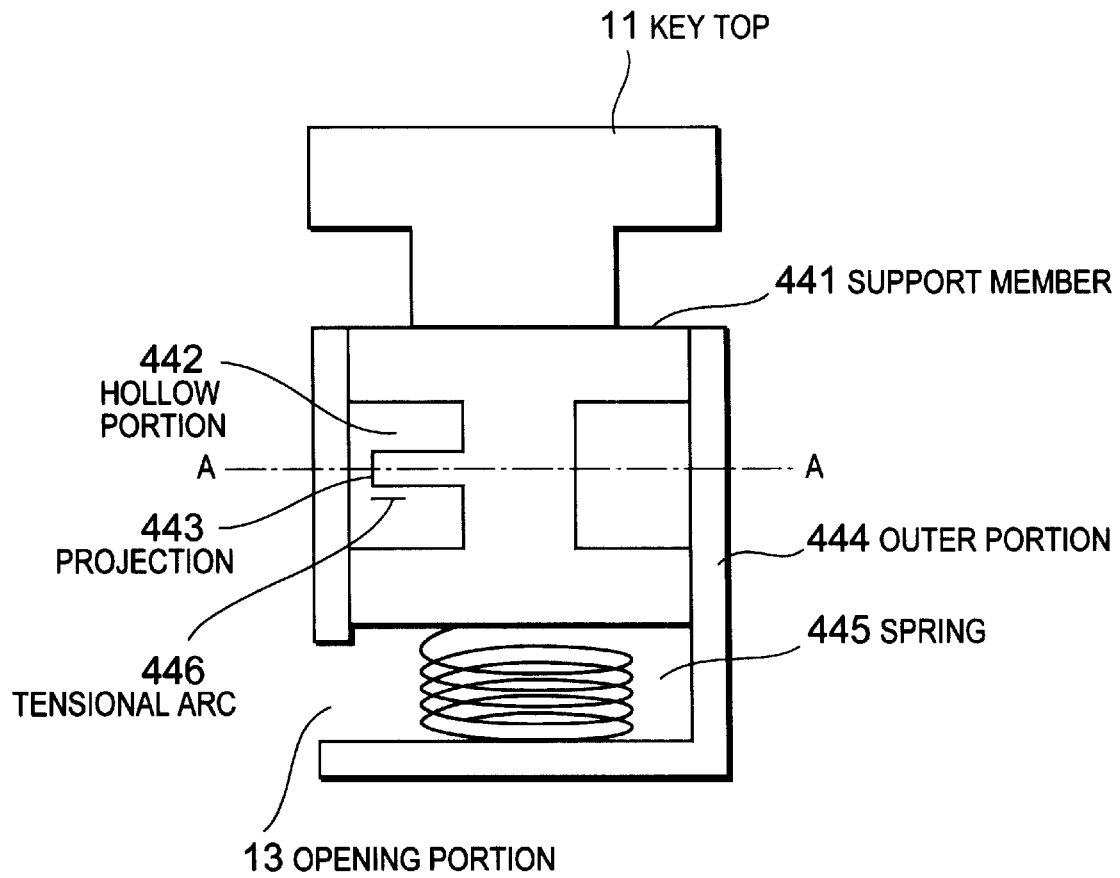
FIG. 8 is a cross-sectional view showing a fourth type of key.

Referring to FIG. 8, the fourth type of key includes a key top 11 to be depressed by a user, a support member 441, a spring 445, a tensional arc 446, and an outer sleeve 444 accommodating these components.

One end of the support member 441 is connected to the key top 11, and the other end is fixed to the spring 445. The support member 441 has a hollow portion 442 in the middle. A projection 443 protrudes from the member 441 into the hollow portion 442.

Figure 9:
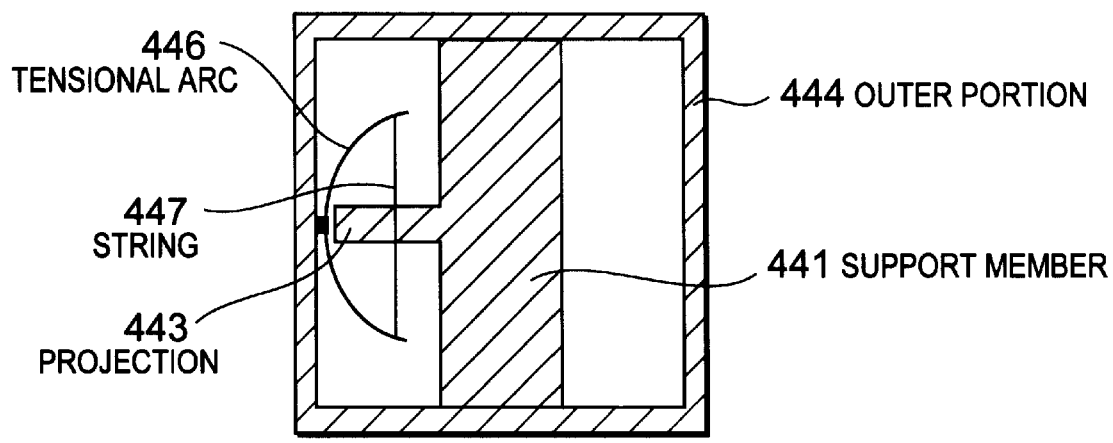
FIG. 9 is a cross-sectional view taken along the line A—A of FIG. 8.
Figure 10:
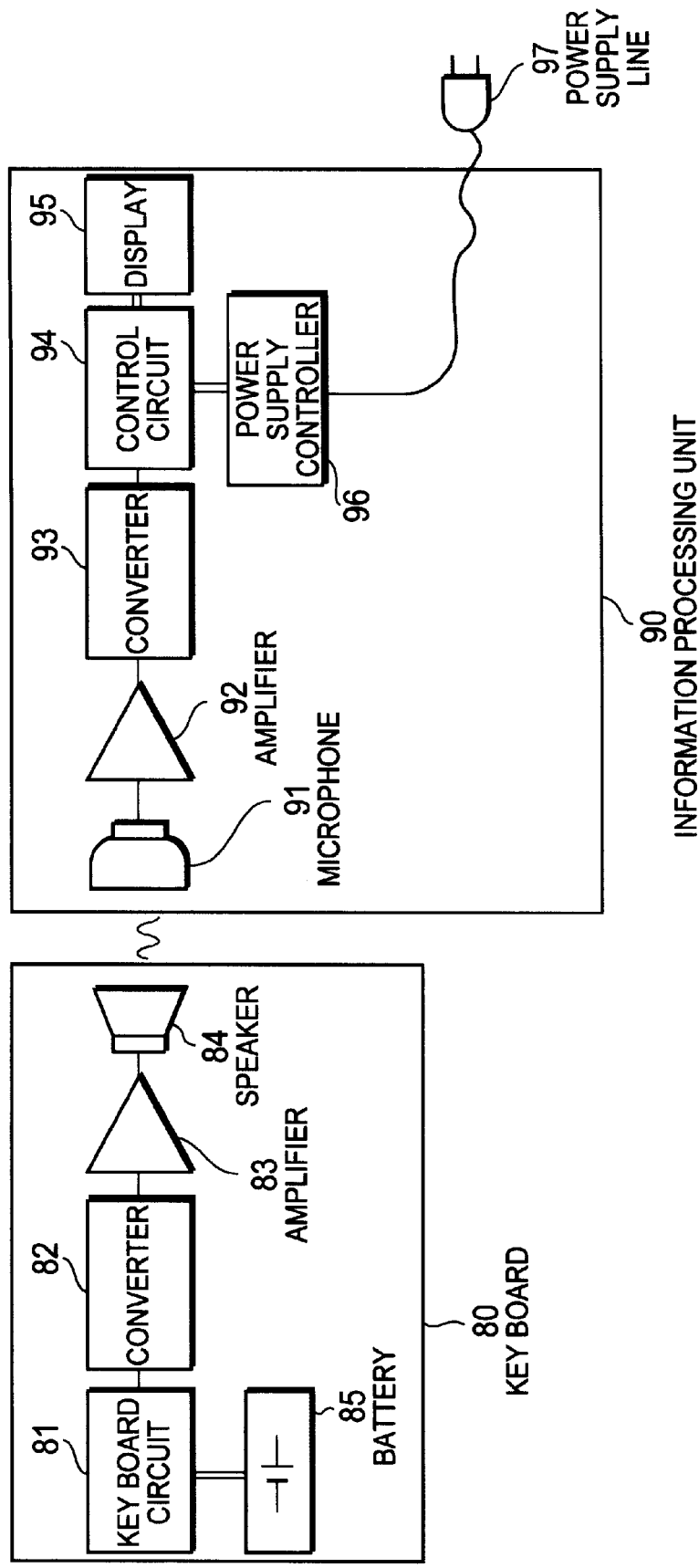
FIG. 10 is a view showing a prior art system disclosed in Japanese Patent Application Laid-Open No. Sho 58-132834.

Also, referring to FIG. 9, the tensional arc 446 is provided in the hollow portion 442 so that a string 447 may come into contact with the projection 443. The tensional arc 446 is fixed to the outer sleeve 444. Incidentally, before the key top 11 is depressed, the projection 443 is located above the tensional arc 446.

With such a construction, the projection 443 of the support member 441 comes down upon the depression of the key top 11 by the user to flick the string 447 to thereby generate the sound.

The sound generated by the key can be changed by changing the diameter and the tension of the string 447, and the shape, the material or the like of the projection 443.

As described above, the present invention has the effect that an electronic apparatus, such as an IPU or a household appliance, and an input unit such as a keyboard or a remote controller can be acoustically connected to each other without electrically connecting the electronic apparatus and the input unit.

In addition, the present invention also has another effect. In a prior art input unit (such as a well-known ordinary keyboard) having an electrical circuit provided with electrical contacts detecting depressed keys when they are depressed by a user, since a positional relationship between each of the keys and corresponding electrical contact is fixed, not changeable, the input unit does not allow the user to change the key layout on the input unit.

On the other hand, since the input unit of present invention need not and does not have such an electrical circuit, and each key is electrically and functionally independent of the other keys, it is possible to flexibly change the layout of the keys on the input unit.

What is claimed is:

1. A key for transmitting data to an electronic apparatus, comprising:
    a key top;
    a sound generating mechanism connected to said key top for generating a predetermined sound without any electrical power supply when said key top is depressed; and
    an outer sleeve accommodating said sound generating mechanism and having an opening portion for outputting said sound to the outside so that said sound may be received by said electronic apparatus.

2. A key as claimed in claim 1, wherein said sound generating mechanism includes a pump, the air within which is compressed when said key top is depressed, and a whistle for generating said sound by part of which air depressed by said pump.

3. A key as claimed in claim 1, wherein said sound generating mechanism includes a hammer connected to said key top and coming down when said key top is depressed, a tuning fork fixed to said outer sleeve and colliding with said hammer that has been come down for generating said sound, a support member for supporting said hammer, and a spring connected to said support member and the bottom of said outer sleeve.

4. A key as claimed in claim 1, wherein said sound generating mechanism includes an inner sleeve connected to said key top, coming down when said key top is depressed, and at that time coming into frictional contact with a side wall of said outer sleeve for generating said sound, and a spring connected to the bottom of said outer sleeve and said inner sleeve.

5. A key as claimed in claim 1, wherein said sound generating mechanism includes an arc fixed to said outer sleeve and having a string tensioned on said arc, a support member connected to said key top and having a means lowered for flicking said string when said key top is depressed, and a spring connected to the bottom of said outer sleeve and said support member.

6. An input unit comprising:
    a plurality of keys allotted for predetermined information, respectively; and
    each of said plurality of keys comprising:
        a key top,
        a sound generating mechanism connected to said key top for generating a sound, proper to said key, without any electrical power supply when said key top is depressed, and
        an outer sleeve accommodating said sound generating mechanism and having an opening portion for outputting said sound to the outside so that said sound can be received by an electronic apparatus.

7. A input unit as claimed in claim 6, further comprising a resonating box for collecting said sound generated by said respective keys and outputting said sound to the outside.

8. A control system including an input unit provided with a plurality of keys, and an electronic apparatus, said system comprising:
    said keys each including:

a key top, a sound generating mechanism connected to said key top for generating a sound, proper to said key, without any electrical power supply when said key top is depressed, and an outer sleeve accommodating said sound generating mechanism and having an opening portion for outputting said sound to the outside so that said sound can be received by said electronic apparatus; and said electronic apparatus including:

a receiving means for receiving said sound, and a converting means for converting said sound that has been received by said receiving means, to a string of specific digital data row corresponding to said sound.

9. A control system as claimed in claim 8, wherein in the case where at least two keys out of said plurality of keys are simultaneously depressed, and a combined sound of at least two sounds generated simultaneously from said at least two keys is received by said receiving means, said converting means converts said sound into a string of specific digital data row corresponding to said combined sound.

10. A control system as claimed in claim 8, wherein in the case where at least two keys out of said plurality of keys are simultaneously depressed, and a combined sound of at least two sounds generated simultaneously from said at least two keys is received by said receiving means, said electronic apparatus further comprises an identifying means for analyzing said combined sound and identifying said at least two sounds for constituting said combined sound, and said converting means converts said sound into a string of digital data row on the basis of said at least two sounds constituting said combined sound identified by said identifying means.

11. A controlling system including an input unit provided with a plurality of keys, and an electronic apparatus, said system comprising:

said keys each including:

a key top, a sound generating mechanism connected to said key top for generating a sound, proper to said key, without any electrical power supply when said key top is depressed, and an outer sleeve accommodating said sound generating mechanism and having an opening portion for outputting said sound to the outside so that said sound can be received by said electronic apparatus; and said electronic apparatus including:

a receiving means for receiving said sound, and a forming means for generating a string of specific digital data row, wherein after a specific sound generated by a depression of a key top of a predetermined specified key out of said plurality of keys has been received by said receiving means, other sound generated by a depression of a key top of other key is received by said receiving means, said forming means generates the specified digital data row on the basis of said specific sound and said other sound.

12. A control system as claimed in claim 11, wherein said electronic apparatus further comprises a canceling means for canceling the fact that said specific sound is received by said receiving means in the case where said receiving means has not received said other sound for a predetermined period of time.

13. A control system as claimed in claim 11, wherein said plurality of keys includes at least one key for generating a sound corresponding to data for instructing to said electronic apparatus the assumption that said specific sound had not been transmitted to said electronic apparatus.

* * * * *